Sept. 20, 1932.     J. R. MINSKY ET AL     1,878,795
JUICE EXTRACTOR
Filed July 23, 1931
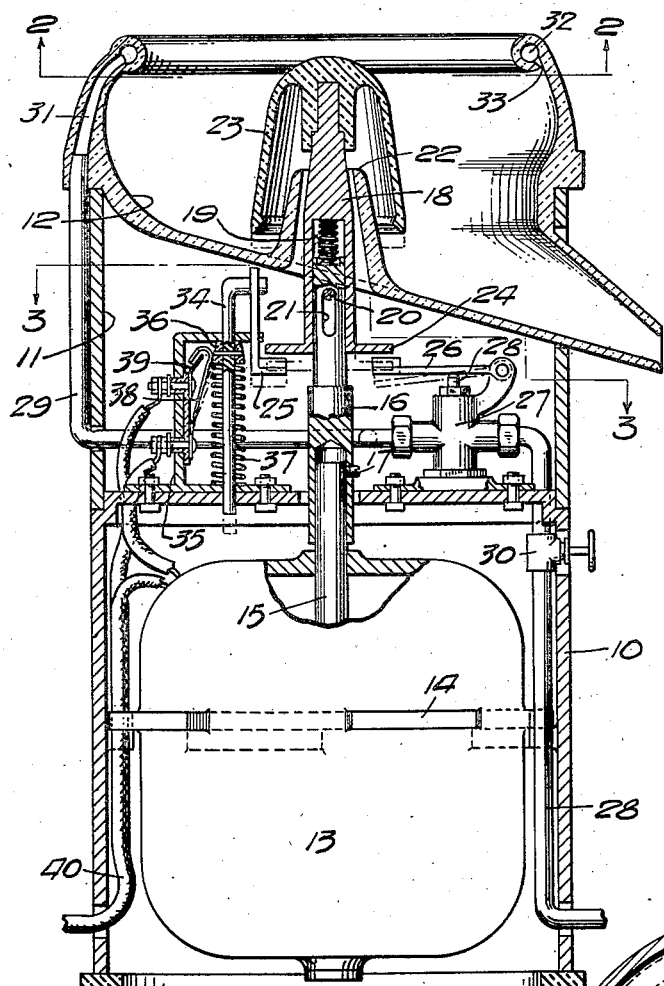
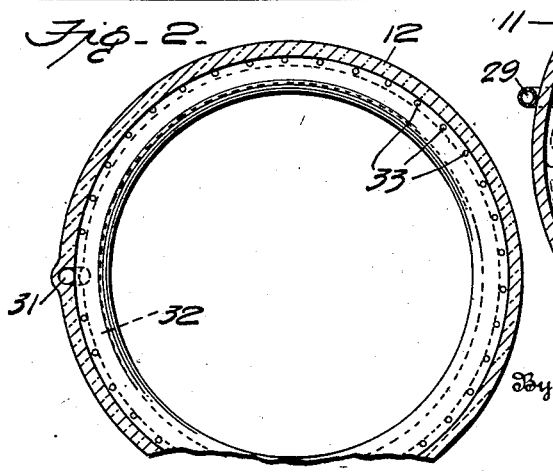
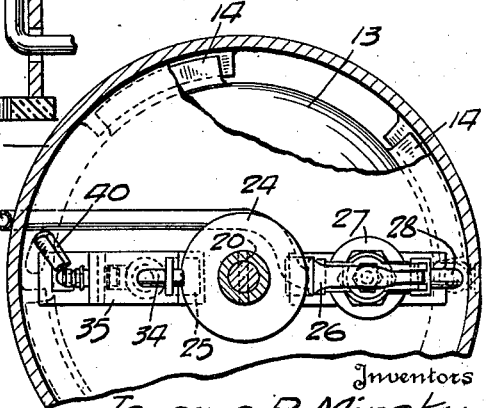
Inventors
Jerome R. Minsky
Roy Burnham Patented Sept. 20, 1932

1,878,795

UNITED STATES PATENT OFFICE

JEROME R. MINSKY AND ROY BURNHAM, OF LAKE VILLAGE, ARKANSAS

JUICE EXTRACTOR

Application filed July 23, 1931. Serial No. 552,759.

Our present invention relates generally to fruit juice extractors, and more particularly those utilized in connection with citrus fruits and of the type wherein a motor driven extractor head upstands and rotates within a bowl-like juice catcher having a laterally and downwardly inclined outlet spout from which the juice flows into a glass.

Extractors of the present type are commonly used at soda fountains and other drink dispensaries, and after receiving the juice, the drinking glass or cup is filled in a second operation with still or carbonated water. We aim to combine the two operations and also eliminate the necessity of separate manual manipulation of a motor starting and stopping switch.

According to our invention, depression of the extractor head upon which the fruit is placed automatically starts the motor for rotating the head and at the same time permits of a flow of water into the juice receiving bowl for mixture with the extracted juice and for passage with this juice into the receiving glass or cup.

One of the objects of our invention is the provision of such means for the above purposes as will permit the operator to control, by a variation of the pressure on the extractor head, the amount of water supplied to the bowl while at the same time maintain the motor in constant operation. This we aim to do without undue complication and an arrangement insuring constant effective action, in practice.

The manner in which we carry out these and other objects of our invention, as well as the particular means utilized therefor, will be apparent from the following description, forming a part of this application, and by reference to the accompanying drawing, in which:

Figure 1 is a central vertical sectional view through our improved juice extractor; and, Figures 2 and 3 are horizontal sectional views taken, respectively, on lines 2—2 and 3—3 of Figure 1.

Referring now to these figures, the body of our improved extractor includes a lower upright cylindrical section 10 adapted to rest at its lower open end upon any suitable support, and an upper cylindrical section 11 whose lower end seats in telescopic relation upon the lower section and whose upper end in turn provides a seat for the bowl 12.

A motor 13 is mounted on the base section 10 and removably supported by virtue of lugs or brackets 14, the motor shaft 15 projecting upwardly through an opening centrally of the top 10ª of the base section 10. Upon this shaft 15, the lower axially bored end of an extension shaft 16 is secured by a set screw 17.

The reduced upper end of the extension shaft 16 is lengthwise slotted and projects into the lower cylindrical portion of the extractor stem 18 and engages an inner coil spring 19. This spring, in the absence of pressure on the stem 18, holds the latter in upper inactive position, and a pin 20 through the stem and through the slot 21 of the extension shaft completes a driving connection between these parts.

The stem 18 projects upwardly through a lower central opening of the bowl 12, around which the latter has an upstanding neck 22, and the upper reduced end of the stem receives the conical rounded extractor head 23, which, according to our invention, is formed of hard rubber so as not to be affected by the acid of the fruit juices.

The simple driving connection between the stem 18 and extension shaft 16 permits the former to be lowered by pressure on the extractor head 23 when the fruit is placed on the latter, and this stem has a lower circumferential horizontally outstanding flange 24. As the stem 18 is lowered, its flange 24 engages the free ends of a pair of arms 25 and 26 diametrically opposed, forcing said arms downwardly with the flange, as indicated in the dotted lines in Figure 1.

The arm 25 controls the action of the motor 13 in a manner which I will presently describe, while the arm 26 is pivoted at its outer end upon a valve casing 27 and bears upon the valve stem 28 so that when depressed the arm 26 causes the opening of a valve in the casing 27 which permits flow of water from a supply pipe 28 to a feed pipe 29. The supply pipe extends upwardly through the base section 10 from any suitable source and preferably has a cut off valve 30 therein with an externally exposed handle.

The feed pipe extends across the top of section 10 and externally through and upwardly alongside section 11 at the top of which it terminates in a tapering extremity adapted to snugly interfit the lower end of a bore 31 in the wall of the bowl 12. The bowl also has a fluid channel 32 in and around its upper edge, communicating with the bore 31 and with a series of inner openings 33 around the said edge of the bowl adjacent to its inner surface. Thus, the fluid will flow down within the bowl, washing down its inner surface, and will join the extracted juice for discharge wth the latter, and it is obvious that the arrangement provides for control of the amount of water so fed by variation of pressure on the extractor head 23.

The arm 25 is fixed in connection with a vertically movable stem 34 mounted to slide in a bracket 35 on the top of the base section 10. This stem has a fixed conical cam member 36 normally held in upper position, by a coil spring 37, where it engages a spring contact arm 38 and forces the latter away from its companion contact piece 39. The motor 13 is supplied with current through wires 40, one of which is connected to the contact arm 38, and the other to the contact piece 39.

Thus, when the extractor head is forced downwardly at the start of an operation, the flange 24 strikes arm 25 and lowers the stem 34, against the tension of spring 37. The cam 36 moving downwardly with the stem 34 permits the spring contact arm 38 to engage contact piece 39, thus completing the motor circuit and starting the operation. Since the extent of downward movement of the stem 34 is immaterial after the contacts have engaged, it becomes plain that beyond depression of the extractor head sufficiently to start the motor, the operator has a wide range of variation of pressure on the head to control the flow of water or fluid, as above described.

Our invention thus presents an effective arrangement of parts singularly devoid of complication and capable of continuous efficient operation.

What is claimed is:

1. A juice extractor, including a rotatable and depressible extractor head having a spring support and a flanged stem, a bowl in which said head rotates having a fluid channel with openings into the bowl, fluid supply means leading to said channel, including a control valve having a control arm below and in the path of movement of said stem flange, a motor for rotating said head having current supply connections, including spring engaging contact members, and a spring actuated slide active to normally separate said contacts and having a portion thereof below the stem flange and in the path thereof for shifting said slide to inactive position upon depression of said head.

2. A juice extractor, including a rotatable and depressible extractor head having a spring support and a flanged stem, a bowl in which said head rotates having a fluid channel with openings into the bowl, fluid supply means leading to said channel, including a control valve having a control arm below and in the path of movement of said stem flange, a motor for rotating said head having current supply connections, including spring engaging contact members, and a spring actuated slide active to normally separate said contacts and having a portion thereof below the stem flange and in the path thereof for shifting said slide to inactive position upon depression of said head, said slide being further freely movable while inactive to permit variable actuation of the valve control arm.

In testimony whereof we affix our signatures.

JEROME R. MINSKY.
ROY BURNHAM.